United States Patent [19]

Hewitt et al.

[11] Patent Number: 4,459,718
[45] Date of Patent: Jul. 17, 1984

[54] FLUID PRESSURE OPERATED RECIPROCATING MECHANISM

[76] Inventors: Delbert C. Hewitt; Gabriel V. Fasolino, both of P.O. Box 365, Wilsonville, Oreg. 97070

[21] Appl. No.: 384,941

[22] Filed: Jun. 4, 1982

[51] Int. Cl.³ .............................................. B60S 1/12
[52] U.S. Cl. .............................. 15/250 B; 15/250.29; 91/313
[58] Field of Search ................. 15/250 B, 250.29; 91/313, 216 B

[56] References Cited

U.S. PATENT DOCUMENTS

| | | |
|---|---|---|
| 1,054,481 | 2/1913 | Adams . |
| 1,259,300 | 3/1918 | Schnak . |
| 1,338,002 | 4/1920 | Derry . |
| 2,789,545 | 4/1957 | Dolza et al. ................. 91/313 X |
| 3,158,935 | 12/1964 | Rosenthal . |
| 3,685,087 | 8/1972 | Pittman . |
| 3,866,258 | 2/1975 | DeGraw . |
| 4,212,091 | 7/1980 | Jones ................. 15/250 B |
| 4,296,672 | 10/1981 | Inhofer ................. 91/313 X |

Primary Examiner—Peter Feldman
Attorney, Agent, or Firm—Eugene M. Eckelman

[57] ABSTRACT

A piston head has opposite fluid drive surfaces and is enclosed in a cylinder housing also having opposite fluid drive surfaces. The piston head is secured to a piston rod anchored at one end to a stationary support whereby the piston head and cylinder housing produce driving movement of the cylinder housing. The cylinder housing has a work engaging arm on the exterior thereof. Fluid supply conduits lead into the piston head and open between the fluid drive surfaces. Control valves are provided between a pressured fluid supply and the piston head and include cycling controls providing advancing and retracting movement of the cylinder housing for reciprocating operation of the work engaging arm. A cycling operation is initiated by a normally closed spring return operating valve.

4 Claims, 5 Drawing Figures

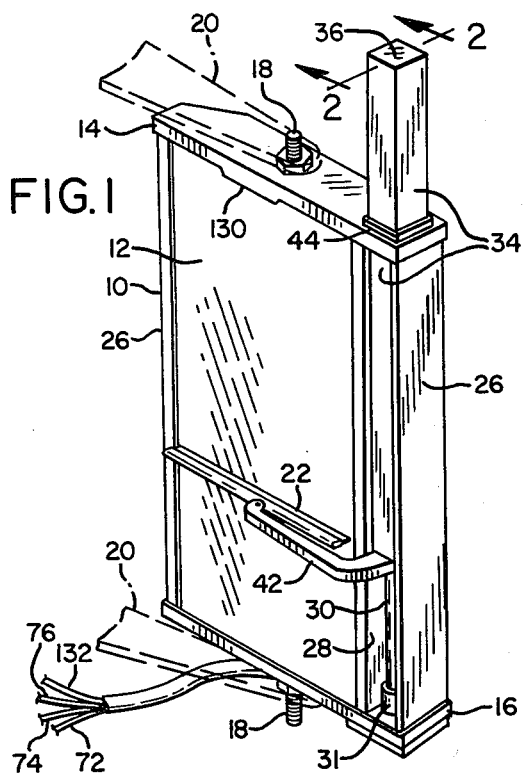
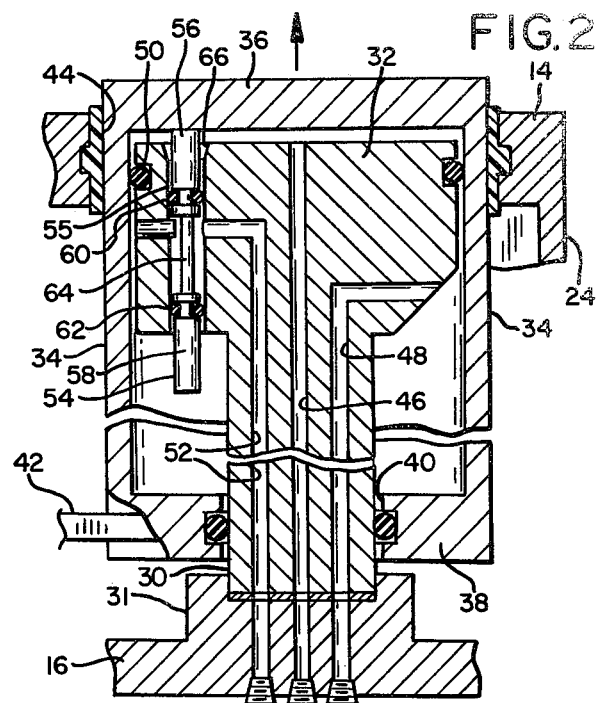
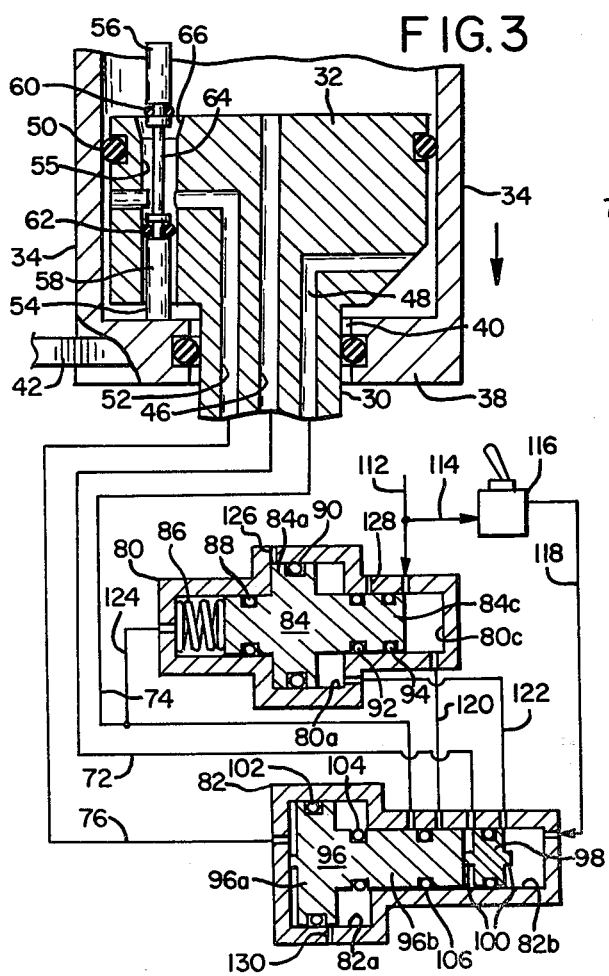
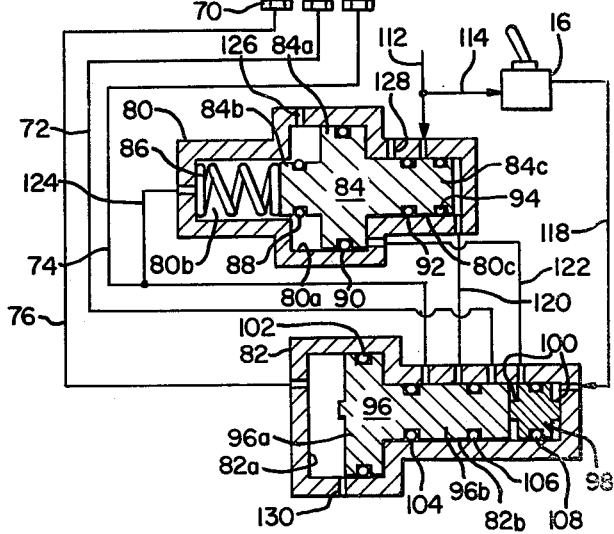
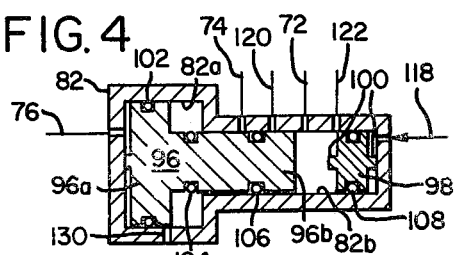
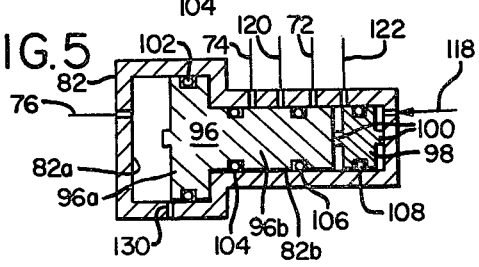

FLUID PRESSURE OPERATED RECIPROCATING MECHANISM

FIELD OF THE INVENTION

This invention relates to new and useful improvements in fluid ppressure operated reciprocating mechanisms.

SUMMARY OF THE INVENTION

According to the present invention and forming a primary objective thereof, a fluid pressure operated reciprocating mechanism is provided having a novel operational function for combination with structures wherein it is desired to move work engaging means reciprocably in a working cycle.

Another object of the invention is to provide a fluid pressure operated reciprocating mechanism of the type described that is simplified in construction, relatively inexpensive to manufacture, and rugged in operation.

Still another object of the invention is to provide a mechanism of the type described which is particularly operable as incorporated in a wiper mechanism for truck side view mirrors.

A more particular object is to provide a fluid operated cylinder arrangement having a movable driven member for operating work engaging means and being combined with novel control means for controlling advancing and retracting movement thereof.

In carrying out these objectives, the mechanism employs a piston head with opposite fluid drive surfaces and a cylinder housing which encloses the piston head. The piston head is on a piston rod secured to a stationary member. The piston head and cylinder housing have opposite fluid drive surfaces for driving the cylinder housing in reciprocating movement. The cylinder housing has work engaging means on its exterior. Fluid supply means lead into the piston head and open between the fluid drive surfaces for providing the working force. Control valve means include supply and directional control valves having a novel structure providing advancing the retracting movement of the cylinder housing in an operating cycle initiated by a normally closed operating valve.

The invention will be better understood and additional objects and advantages will become apparent from the following description taken in conjunction with the accompanying drawings.

BRIEF DESCRIPTION OF THE DRAWINGS

FIG. 1 is a perspective view of apparatus illustrating an exemplary use of the invention, namely, a wiper apparatus for truck side view mirrors;

FIG. 2 is an enlarged foreshortened sectional view taken on the line 2—2 of FIG. 1 and showing a detail of the fluid pressure operated reciprocating mechanism and control means therefor in off position, a portion of this view being diagrammatic;

FIGS. 3 and 4 are fragmentary views taken similar to FIG. 2 and showing the control means in a position for operating the reciprocating mechanism in one direction, a portion of this view also being diagrammatic; and FIG. 5 is a view of a portion of the control means in shifted position for operating the reciprocating mechanism in its other direction.

DETAILED DESCRIPTION OF A PREFERRED EMBODIMENT

The fluid pressure operated reciprocating mechanism of the instant invention is shown in combination with a truck side view mirror 10, FIG. 1, having a mirror face 12 supported in a housing having top and bottom wall portions 14 and 16, respectively, and suitable mounting studs 18 or the like for support of the housing on mirror brackets 20 of the truck. The structure of the mirror thus far described is conventional but according to the invention, such mirror includes a wiper blade 22 having up and down travel for wiping the mirror surface. The wiper blade 22 comprises a working member which is driven by a fluid pressure operated piston and cylinder assembly of the invention and which may form a part of any other type of structure requiring reciprocating cycling movement. The structure and function of the invention is readily apparent by a consideration of its combination with the side view mirror 10 as will now be apparent.

Mirror housing 10 has a rear wall 24, FIG. 2, and side walls 26 which form the mirror housing together with the mirror 12 and the top and bottom walls of the housing. The front of the mirror housing 10 has a front opening recess 28 at one side. A piston rod 30 is contained in the recess 28 and is secured integrally at its bottom end by any suitable connection 31 to the bottom wall 16 of the mirror housing. Piston rod 30 terminates at its upper end in a piston head 32. The piston rod 30 is of a length such that the head 32 is disposed adjacent the upper end of the mirror.

A cylinder housing 34 encloses the piston rod 30 and head 32 and has a closed upper end 36 and a lower end 38 having an aperture 40 slidably receiving the piston rod therethrough in a sealed engagement. The lower end 38 of the housing 34 has a wiper arm 42 with a laterally extending portion supporting the wiper blade 22 in a conventional manner, such as a spring loaded pivot connection. With the secured connection of the piston rod 30 to the mirror housing at the bottom, selected pressure within the housing 34 will cause the latter to move relative to the piston whereby the wiper blade 22 will have a wiping function by up and down cycling functions of the cylinder housing 34, to be described. Cylinder housing 34 has a slidable guided movement through the top wall 14 of the mirror housing by means of a bearing lined aperture 44 in such top wall.

With particular reference to FIG. 2, fluid passageway means for cycling operation of the cylinder housing 34 are provided in the piston rod 30 and piston head 32. Such passageway means comprise an up passageway 46 and a down passageway 48, the passageway 46 opening through the top of the piston head and the passageway 48 opening through the bottom of the piston head. Piston head 32 has suitable sealing means 50 with the cylinder housing. Piston rod 30 also has a third passageway 52 leading to a longitudinally extending signal valve 54 slidable in a longitudinal bore 55 in the piston head. This signal valve has a length greater than the top to bottom dimension of the piston head 32 whereby one of its upper or lower ends 56 and 58, respectively, will project from the piston head. Valve 54 has spaced seals 60 and 62 at opposite ends of an intermediate, reduced diameter portion 64, and the bore 55 has an enlargement 66 at its upper end. In one position of the valve, namely, the FIG. 2 position, passageway 52 is sealed off from communication with the interior of the housing 34. The valve 54 is moved to this FIG. 2 position by mechanical engagement thereof in a down position of the cylinder housing 34. In the up position of the cylinder housing 34, FIG. 3, the valve 54 will have been engaged by the bottom of the cylinder housing and raised to provide communication through bore 55 and enlargement 66 of this bore between the interior of cylinder housing 34 above the piston head 32 and the passageway 52. The purpose of signal valve 54 will become more apparent hereinafter.

The passageways 46, 48 and 52 lead through the bottom end of piston rod 30 and through the bottom wall 16 and have suitable fittings 70 in the bottom wall with lines or conduits 72, 74, and 76 associated with passageways 46, 48 and 52, respectively. These lines are shown diagrammatically in FIGS. 2-5 and lead into control means now to be described.

With reference to FIG. 2, the control means comprises a supply valve 80 and a directional control valve 82. Supply valve 80 comprises a housing including a central cylinder area 80a and reduced diameter end areas 80b and 80c. Valve 80 slidably encloses a spool 84 having a head portion 84a operating in central cylinder area 80a and end projecting portions 84b and 84c operating in respective cylinder areas 80b and 80c. Spool 84 is urged away from the area 80b by a compression spring 86. Such spring and surface areas of the spool are arranged such that the spring normally holds the spool 84 at the opposite end of the valve but can be overcome by fluid pressure in the system operating on the opposite end surfaces of the spool. End projection 84b of the spool has one surface seal 88, head 84a has one surface seal 90, and end projection 84c has a pair of spaced surface seals 92 and 94.

Directional control valve 82 comprises a housing including an end cylinder area 82a and a reduced diameter area 82b. It slidably encloses a directional spool 96 and a start spool 98. Spool 96 has a head portion 96a operating in the cylinder area 82a and a reduced diameter projecting portion 96b operating in area 82b. Spool 98 is disposed in area 82b of the valve opposite from the head portion 96a of the directional spool and has end tabs 100 to maintain it in spaced relation from the spool 96 as well as from the end of the housing. Head portion 96a has one surface seal 102 and projection 96b has a pair of spaced surface seals 104 and 106. Spool 98 has one surface seal 108.

Line 72 from the up passageway 46 is connected into the directional control valve 82 in an area associated with the seals 106 and 108 of the spools 96 and 98, respectively. Line 774 from the down passageway 48 is connected into this same valve in an area associated with seals 104 and 106 of the spool 96. Line 76 from the signal passageway 52 is connected into the end area 82a of directional control valve 82.

A line 112 from a fluid pressure supply such as an air compressor, not shown, is connected into the supply valve 80 in an area associated with seals 92 and 94. The line 112 has a branch line 114 leading to a normally closed, spring return, manually operable valve 116 arranged such that when momentarily opened permits a signal pressure to flow through a line 118 leading into the end of the directional control valve 82 at the start spool 98. A pressure supply line 120 leads from an end portion of area 80c of supply valve 80 adjacent seal 94 to area 82b of valve 82 adjacent seals 104 and 106. Also, a line 122 leads from area 82b of directional control valve 82 adjacent seal 108 to the area 80a of supply valve 80 on the side of head portion 84a opposite the spring 86. Another line 124 leads from the line 74 to the end of area 80b of valve 80.

The spools in the valves 80 and 82 are of less diameter than their respective housing portions whereby air can freely move therearound. The various seals, however, have pressure engagement with the valve housing portions to confine the pressured area between or up to the seals.

An exhaust port 126 is provided in the valve 80 in the area 80b of the spring side of head portion 84a and an exhaust port 128 is provided in the area 80c at the end adjacent the head portion 84a. An exhaust port 130 is provided in valve 82 in the area 82a.

OPERATION

The particular arrangement of line connections and spacing of the seals on the valve parts will become more apparent from a description of the operation. In an off position of the mechanism, the cylinder housing 34 is in a down position as shown in FIG. 2. In such down position, the signal valve 54 is shifted to its lowered position by the housing 34 in the lowering movements of the latter. The spools 84, 96 and 98 are at their right hand position as seen in FIG. 2. In such position, seals 92 and 94 of supply spool 84 prevent communication between the pressure line 112 and supply line 120. There is thus no pressure admitted through the directional control valve to the fluid operated housing 34. Valve 116 in its normally closed position, shuts off pressure to line 118.

To initiate a cycle, the operator actuates the valve 116 momentarily to move it to its open position. He then releases it for self closing. The momentary opening of valve 116 establishes a pressure in line 118 which moves the spools 96 and 98 as a unit to the left, FIG. 3. With the spools 96 and 98 in this position, the start signal from line 118 can also flow to the supply valve through line 122 and apply a force against spool 84 to assist in causing such spool to overcome the action of spring 86. In this position, fluid pressure from line 112 is in communication with the up line 72. In such movement of the spools 84 and 96, fluid behind the spool 84 can exhaust through port 126 and fluid behind spool 96 is compressed. Supply air pressure is now acting on the right end of spool portion 84 to also hold it against the action of spring 86. In this position of the spools, pressure in the up passageway 46 raises the cylinder housing 34 to move the wiper blade upwardly, the down passageway 48 exhausting through port 130 in area 82a in such movement.

At the time that the operator releases the operating valve 116, air is exhausted from the right side of the start spool 98 and the supply air which is now acting on the left side of such spool moves it to its original right hand position. This latter position is illustrated in FIG. 4. Pressured air from supply 120 also now flows through line 122 to the rear side of head 84a to assist in holding spool 84 to the left against the action of the spring 86.

When the cylinder housing 34 reaches its upper limit position, it will have moved the signal valve 54 upwardly as shown in FIG. 3. This allows the compressed fluid in the top of the cylinder to flow back to the directional control valve through bore 55, its enlargement 66, and line 76, and such pressure to the directional valve forces spool 96 back to its original position, FIG.

5, whereby air from the supply line 120 flows to the line 74 and to the down passageway 48 for moving the cylinder housing 34 back down. Although the supply air pressure is pushing to the left on spool 96 before it is shifted, the reversing signal from line 76, because it acts on the larger end of such spool, can move the latter to the right against the lesser force. Fluid above the piston 32 exhausts through line 76 in such movement. When the cylinder housing reaches the down position, it will have moved the signal valve 54 down to close off the bore enlargement 66 whereby the signal valve is moved to the correct position for the next cycle.

When the cylinder housing 34 reaches it down position, fluid under pressure continues to flow into the bottom of the cylinder housing through conduit 74 and passageway 48 and pressure builds up in line 124 between the line 74 and the spool 84 in supply valve 80. The pressure quickly reaches the maximum pressure of the system which, acting in conjunction with the spring force, overcomes the pressure of the supply pressure acting on the right end of spool 84, whereby spool 84 is pushed back to its original position to close off the pressure supply from line 112. Fluid behind the head portion 84a can exhaust at this time through port 128. Air supply is thus shut off to the directional control valve. Also, when the spool 84 is returned to its original position, fluid in the down passageway 48 and line 74 can exhaust through the port 126. The supply valve 80 is now in its FIG. 2 off position and read for the next cycle of operation to be initiated by actuation of valve 116.

A washer nozzle 130 may be incorporated in the top wall 14 of the mirror housing and be associated with water supply means in a conventional manner for supplying water to the mirror surface. The water supply means includes an infeed conduit 132 suitably connected into the mirror housing and communicating with the nozzle.

It is to be understood that the form of my invention herein shown and described is to be taken as a preferred example of the same and that various changes in the shape, size and arrangement of parts may be resorted to without departing from the spirit of my invention, or the scope of the subjoined claims. As stated hereinbefore, the present fluid pressure operated reciprocating mechanism can be used in any suitable application requiring cycling of an air cylinder. Although the valves 80 and 82 are shown apart from each other for clarity, it is understood that they can be combined into a single housing for reducing connections between the various inlet and outlets.

Having thus described my invention, I claim:

1. A side view mirror mechanism comprising
   (a) a mirror housing having a mirror face,
   (b) means on said housing for mounting it on a vehicle,
   (c) a fluid pressure operated reciprocating mechanism for said mirror comprising a piston head having opposite fluid drive surfaces,
   (d) a cylinder housing enclosing said piston head having opposite fluid drive surfaces associated with respective fluid drive surfaces of said piston head,
   (e) a piston rod on said piston head projecting slidably through one end of said cylinder housing,
   (f) means securing one of said cylinder housing or said piston rod to said mirror housing whereby the other of said cylinder housing or piston rod comprises a movable member arranged to have advancing and retracting movement,
   (g) a wiper blade supported on the exterior of said movable member at said mirror,
   (h) fluid supply means leading into one of said piston head or cylinder housing and opening between said fluid drive surfaces of said piston head and cylinder housing,
   (i) control valve means connected to said fluid supply means and arranged for connection to a source of fluid pressure,
   (j) a movable directional spool in said control valve means controlling the direction of flow into said fluid supply passageways for the said advancing and retracting movements of said movable member,
   (k) a movable start spool in said control valve means controlling the initial movement of said directional spool,
   (l) cycling means in said control valve means and in said piston head or cylinder housing providing said advancing and retracting movement of said movable member for reciprocating operation of said wiper blade to clean the mirror,
   (m) said cyling means including a signal valve in one of said piston head or cylinder housing operated by movement of said movable member to assist in reversing the direction of movement of said movable member,
   (n) and a normally closed operating valve arranged when opened momentarily to cause movement of said start spool for initiating movement of said directional spool to start a cycle.

2. A side view mirror mechanism comprising
   (a) a mirror housing having a mirror face,
   (b) means on said housing for mounting it on a vehicle,
   (c) a piston head having opposite fluid drive surfaces,
   (d) a cylinder housing enclosing said piston head and having opposite fluid drive inner surfaces associated with respective fluid drive surfaces of said piston head,
   (e) a piston rod having first and second end portions,
   (f) said first end portion of said piston rod being integral with said piston head,
   (g) said second end portion of said piston rod projecting slidably through one end of said cylinder housing,
   (h) means securing said second end portion of said piston rod to said mirror housing whereby said piston head is stationary and said cylinder housing is movable relative to said piston head,
   (i) a wiper blade supported on the exterior of said cylinder housing in surface engagement with said mirror face,
   (j) fluid supply means leading into said piston head and opening between said fluid drive surfaces of said piston head and cylinder housing,
   (k) control valve means connected to said fluid supply means and arranged for connection to a source of fluid pressure,
   (l) and cycling means in said control valve means and in said piston head or cylinder housing providing advancing and retracting movement of said cylinder housing for reciprocating operation of said wiper blade to clean the mirror face.

3. The side view mirror mechanism of claim 2 wherein said control valve means includes a movable directional spool controlling the direction of flow into said fluid supply passageways for the advancing and retracting movements of said cylinder housing, a movable start spool in said control valve means controlling initial movement of said directional spool, said cycling means including a signal valve in one of said piston head or cylinder housing operated by movement of said cylinder housing to assist in reversing the direction of movement of said cylinder housing, and a normally closed operating valve arranged when opened momentarily to cause movement of said start spool for initiating movement of said directional spool to start a cycle.

4. The side view mirror mechanism of claim 2 including a normally closed operating valve arranged when opened momentarily to cause movement of said directional spool to start a cycle.

* * * * *